US008621781B2

(12) United States Patent
Singh

(10) Patent No.: US 8,621,781 B2
(45) Date of Patent: Jan. 7, 2014

(54) HYDROPONIC IRRIGATION SYSTEM

(76) Inventor: Vijay Singh, Far Hills, NJ (US)

(*) Notice: Subject to any disclaimer, the term of this patent is extended or adjusted under 35 U.S.C. 154(b) by 0 days.

(21) Appl. No.: 13/246,335

(22) Filed: Sep. 27, 2011

(65) Prior Publication Data

US 2013/0074408 A1    Mar. 28, 2013

(51) Int. Cl.
*A01G 31/02*    (2006.01)
(52) U.S. Cl.
USPC .......................................... 47/62 E; 47/62 R
(58) Field of Classification Search
USPC ....... 47/59 R, 60, 61, 62 R, 62 A, 62 C, 62 E, 47/62 N, 63, 65.5, 66.6, 66.7
See application file for complete search history.

(56) References Cited

U.S. PATENT DOCUMENTS

| | | | | | |
|---|---|---|---|---|---|
| 2,855,725 | A | * | 10/1958 | Carothers | 47/17 |
| 3,660,933 | A | * | 5/1972 | Wong, Jr. | 47/62 C |
| 3,925,926 | A | * | 12/1975 | Shigeo | 47/62 C |
| 4,302,906 | A | * | 12/1981 | Kawabe et al. | 47/62 C |
| 4,584,791 | A | * | 4/1986 | Wolf | 47/62 C |
| 4,603,506 | A | * | 8/1986 | Powell, Jr. | 47/62 E |
| 4,669,217 | A | * | 6/1987 | Fraze | 47/64 |
| 4,976,064 | A | * | 12/1990 | Julien | 47/63 |
| 5,067,275 | A | * | 11/1991 | Constance | 47/62 E |
| 5,097,627 | A | * | 3/1992 | Roberts | 47/65 |
| 5,382,270 | A | * | 1/1995 | Graham et al. | 47/62 N |
| 5,394,647 | A | * | 3/1995 | Blackford, Jr. | 47/62 A |
| 5,557,884 | A | * | 9/1996 | Deppe | 47/62 E |
| 6,219,966 | B1 | * | 4/2001 | Lapointe et al. | 47/62 C |
| 6,233,870 | B1 | * | 5/2001 | Horibata | 47/62 R |
| 8,065,833 | B2 | * | 11/2011 | Triantos | 47/62 R |
| 2011/0296757 | A1 | * | 12/2011 | McGrath | 47/62 R |

* cited by examiner

*Primary Examiner* — T. Nguyen
(74) *Attorney, Agent, or Firm* — Barnes & Thornburg LLP

(57) ABSTRACT

A low cost valve and system for automated ebb and flow irrigation utilizes a collapsible sleeve to control fluid flow direction. No external power, moving parts, or floats are needed to operate the valve, resulting in improved reliability, low operating cost, and minimal need for maintenance. The valve operates using feed pressure to close the drain when hydroponic nutrient solution is pumped into the cultivation chamber. The valve drains automatically once the pump is stopped, usually by means of a timer, and the spent hydroponic solution is recovered. The fill/drain cycle is repeated as needed to keep the plants moist, yet not waterlogged.

15 Claims, 4 Drawing Sheets

HYDROPONIC IRRIGATION SYSTEM

BACKGROUND OF THE INVENTION

1. Field of the Invention

The present invention relates generally to valves for controlling the intermittent flooding or flushing of liquids into a vessel, and more particularly to apparatus for controlling the circulation of hydroponic solutions to and from cultivation containers for plants.

In hydroponic culture, a common mode of operation is termed "ebb and flow". In this operation, plants are contained in a culture vessel and the roots are intermittently flooded with a nutrient solution, and then the solution is allowed to drain out. It is important that this "ebb and flow" operation be automated and functions reliably. If the plants roots are not flooded in time, they will dry out resulting in irreparable damage to the plant roots. On the other hand if the hydroponic solution stagnates in the cultivation container, then the roots will rot, again causing irrecoverable damage. In addition to reliable operation, it is essential that the device be low cost and preferably not require a power source.

2. Statement of the Prior Art

In the prior art, the vast majority of such "ebb and flow" valves use a float mechanism. In these devices, a float assembly moves as the water level rises in the plant cultivation vessel. When the liquid level is at the desired height, the float shuts the feed valve off and liquid drains out of the cultivation container back into the feed reservoir. In most cases a low pressure pump is required to provide the feed solution. The biggest problem with float valves is that they have mechanical moving parts and these parts tend to get clogged by roots and other foreign matter that prevent the float from moving freely. The float valves also have small diameter seats in order to make them compact. These limitations cause float valves to frequently malfunction, leading to catastrophic crop failure. Pinch valves have been used as an alternative, but these require a power source to open and close the valve. This results in increased complexity and cost. While pinch valves are less prone to clogging, the possible failure of the power source reduces overall reliability. Other prior art approaches eliminate a valve altogether by having a bleeder orifice or venturi. These require high pressure pumps in order to generate sufficient flow to the cultivation vessel and also suffer from the problem that the drain orifice is usually very small and easily clogged, leading to stagnant hydroponic solution remaining in contact with the plant roots and possible root rot.

SUMMARY OF THE INVENTION

These and other objects, advantages, and novel features are provided by embodiments of the present invention, which overcome the foregoing problems.

The present invention relates to a flood control valve and to a simple and low cost hydroponic irrigation system employing that valve. The irrigation system is capable of operating unattended for weeks at a time with little or no maintenance. It is useful both for large commercial applications, as well as hobby and home use. A variety of plants for decorative and food use can be grown in the system. A single feed pump can supply a number of plant cultivation vessels, which can be of different sizes and positioned at different elevations. A feed pump is activated by an automatic electric timer at preset intervals. The pump draws the hydroponic nutrient solution from a reservoir and supplies it through pipes to a flood control valve located on each plant cultivation vessel. The flood control valve has an inlet and an outlet connection for the feed stream, and similar inlet and outlet ports for draining the spent nutrient solution out of the cultivation chamber. The streams are introduced into a cavity in the valve, but kept separated by a flexible rubber membrane. The feed and drain streams are oriented in opposite directions with the feed stream allowed to flow up through the valve into the cultivation chamber, and the drain stream allowed to flow downwards by gravity. When feed is not flowing through the valve, the flexible membrane is in a relaxed state and centered in the cavity. This orientation permits fluid to drain downwards out of the valve. However, when the feed pump is turned on it pushes nutrient solution upwards through the valve. The flow results in backpressure in the valve cavity and this backpressure causes the flexible membrane to expand and push towards the drain side of the cavity. This expansion of the membrane effectively blocks off the drain side and no liquid can drain out of the valve. This permits the cultivation chamber to fill up rapidly and without wastage. Once the fill cycle is completed, usually set by a timer, the feed pump turns off, backpressure rapidly decays and the flexible membrane returns to the center of the cavity causing spent liquid to start draining out of the cultivation chamber. This design has essentially no moving parts (apart from the flexing of a rubber membrane) and operates automatically without the need for any power. A positionable overflow tube is provided in the valve and can be moved up and down to set the desired height of the nutrient solution in the cultivation chamber during the flooding phase of the cycle.

Accordingly, it is a general object of embodiments of the present invention to provide a flooding control valve with no moving mechanical parts and no requirement for motive power, thereby reducing the likelihood of failure.

More specifically, it is an object of embodiments of the present invention to provide a flooding control valve that is inexpensive to manufacture and can be made with commonly available parts.

It is another object of embodiments of the present invention to provide a flooding control valve in which the maximum liquid level can be easily adjusted by raising or lowering an overflow tube.

It is still another object of embodiments of the present invention to provide a flooding control valve with no flow restrictors or seats, making it less prone to clogging.

It is yet another object of embodiments of the present invention to provide a flooding control valve made entirely of non-metallic parts, thereby eliminating corrosion.

It is a further object of embodiments of the present invention to provide a flooding control valve with an unrestricted drain making it less prone to clogging by debris or precipitates.

It is still a further object of embodiments of the present invention to provide a flooding control valve that is self-cleaning as each cycle compresses and forces any accumulated debris out of the valve cavity.

Further objects and advantages of this invention will become apparent from a consideration of the drawings and ensuing detailed description.

BRIEF DESCRIPTION OF THE DRAWINGS

The foregoing and other features of the present invention will become more apparent from the following description of exemplary embodiments, as illustrated in the accompanying drawings wherein.

DETAILED DESCRIPTION OF THE EMBODIMENTS

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. Persons of ordinary skill in the relevant art will recognize that other components and configurations may be used without departing from the true spirit and scope of the embodiments. It is to be understood that each specific element includes all technical equivalents that operate in a similar manner to accomplish a similar purpose. Therefore, the examples and embodiments described herein are non-limiting examples.

Figure 1:
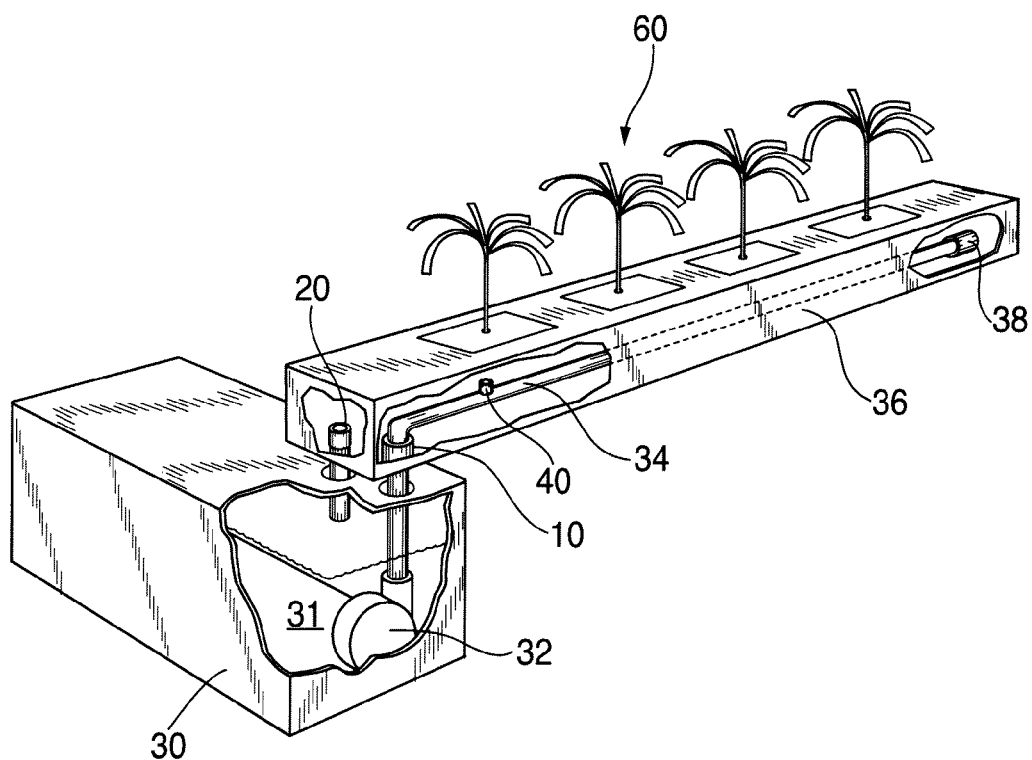
FIG. 1 is a perspective cutaway view of the hydroponic cultivation system which shows the arrangement of the valve of the present invention and other major components.
Figure 2A:
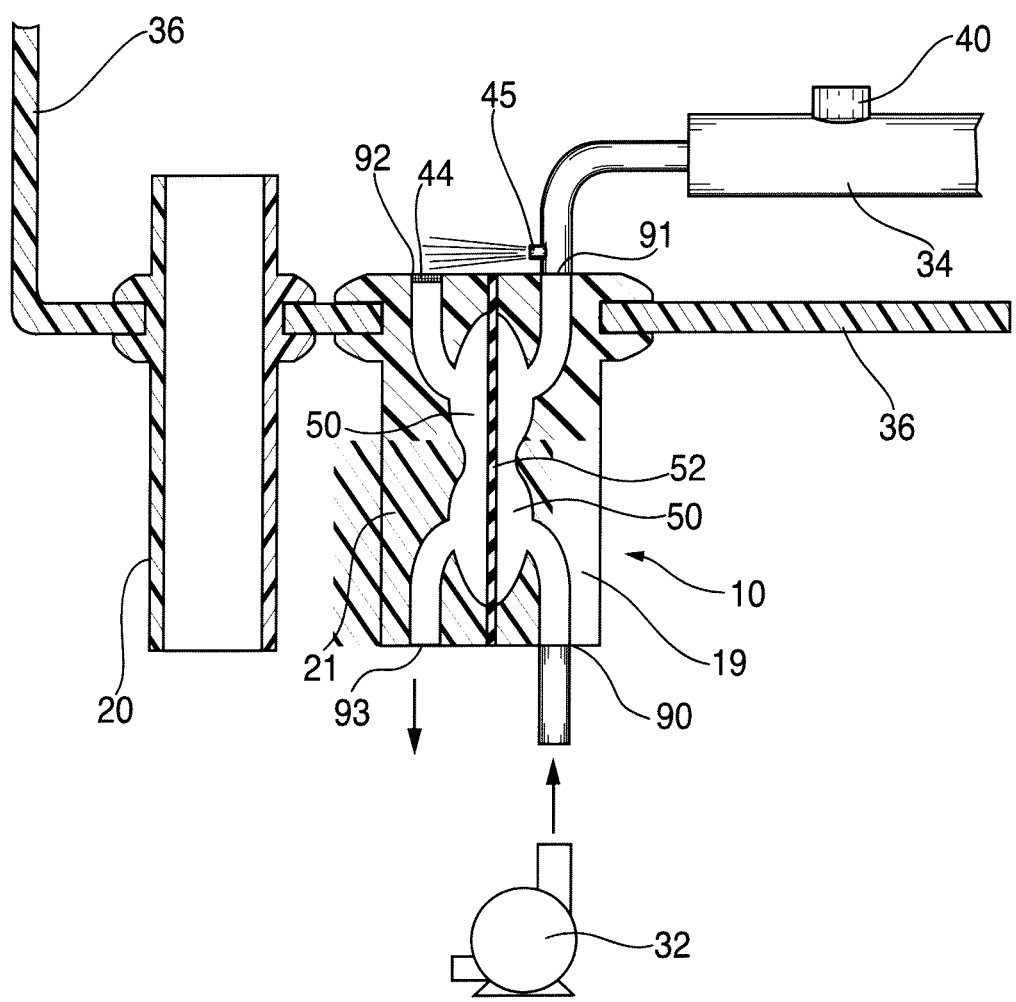
FIG. 2A is a sectional view of the control valve according to one embodiment of the present invention.
Figure 2B:
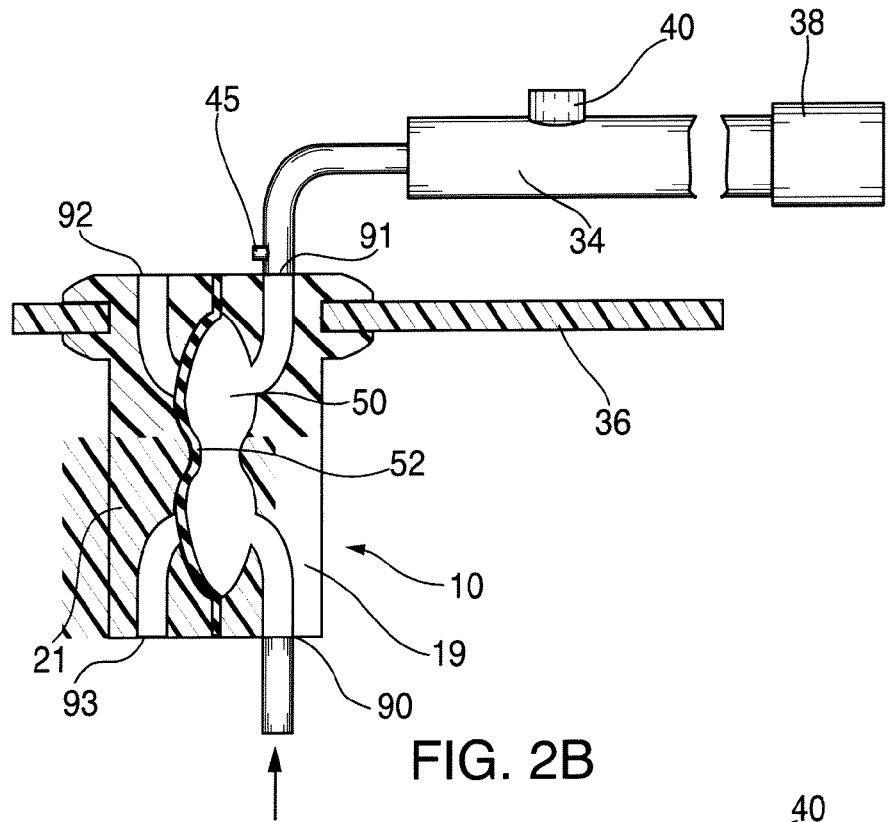
FIG. 2B is a sectional view of the valve in FIG. 2 showing the pressurized (flood) position.
Figure 2C:
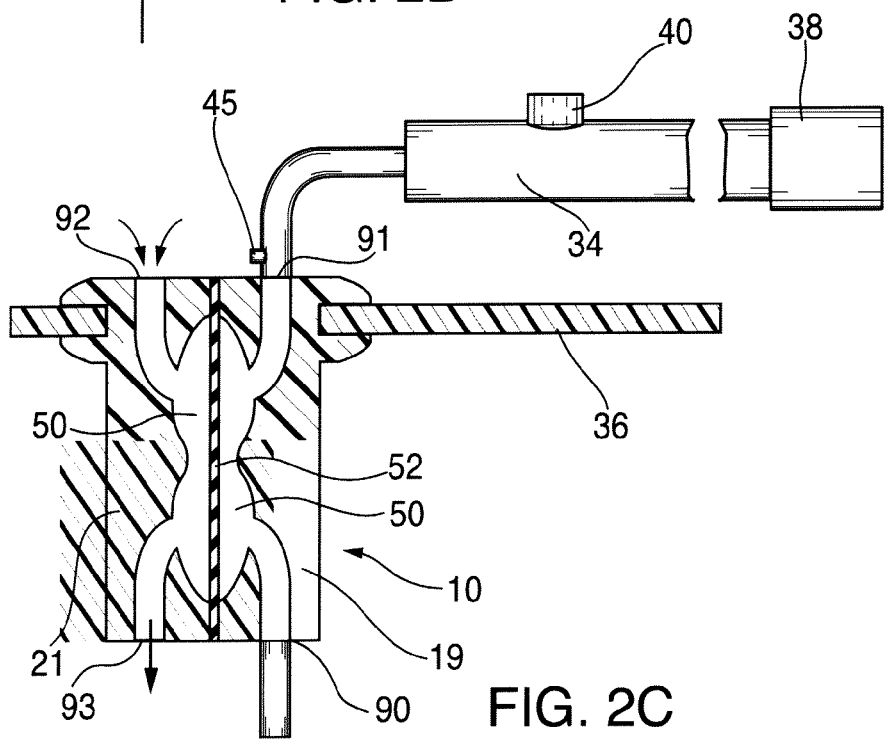
FIG. 2C is a sectional view of the valve in FIG. 2 showing the depressurized (drain) position.

Referring now to the drawings, wherein like reference numbers generally indicate identical, functionally similar, and/or structurally similar elements, there is shown in FIG. 1 an embodiment of the flooding control valve and its associated apparatus. A fluid reservoir 30 supplies the hydroponic solution 31. A pump 32, which may be located inside the reservoir 30, draws fluid and pumps it up through the flooding control valve 10 into delivery tubing 34 which is contained inside the plant cultivation vessel 36. Plants 60 are placed in holes cut into the top of the cultivation vessel. The cultivation vessel is liquid tight except for two openings in the bottom for the flooding control valve 10 and overflow pipe 20. The top of fluid reservoir 30 has a circular cut-out so that when the cultivation chamber is placed on top of the fluid reservoir, the overflow pipe 20 can discharge directly into the fluid reservoir. The discharge pipe from the feed pump 32 is connected to the flooding control valve 10 through another cutout on top of the fluid reservoir. The delivery tubing 34 has a number of spray heads 40 that are distributed along its length. The delivery tubing 34 is closed on the far end by closure fitting 38. When pump 32 is turned on, hydroponic fluid is pumped into the delivery tubing 34. The solution is dispensed into the cultivation vessel 36 through the spray heads 40 which are sized such that delivery tubing remains slightly pressurized (about 0.1 to 1.0 psig). The pressurization causes flooding control valve 10 to shut off flow from the cultivation vessel back into the fluid reservoir. This causes fluid to accumulate in the cultivation vessel 36 until it is at a level sufficient to drain back through overflow tube 20. In the manner, fluid level in the cultivation vessel cannot exceed a preset level as determined by the height of the adjustable overflow tube 20 inside the cultivation vessel 36. The pump 32 can then be turned off which causes flooding control valve 10 to open allowing the cultivation vessel to drain back completely into the fluid reservoir 30 thus completing the "ebb and flow" cycle of irrigation. It should be apparent that it is not critical when the pump shuts off as long it is set to remain on for enough time to cause fluid to reach the overflow pipe. Leaving the pump on for extra time will not cause cultivation vessel 36 to overflow because of the overflow tube. FIGS. 2A through 2C illustrate the operation of the flooding control valve in greater detail.

Referring to FIG. 2A, flooding control valve 10 consists of two symmetric halves 19 and 21 with a flexible rubber membrane 52 mounted in between. Each half has a cavity 50 positioned on either side of the membrane 52. The feed half 19 has feed port 90 that introduces the feed stream from the pump 32 into the cavity 50. Port 91 allows fluid to leave the cavity on the feed side 19 of the valve into delivery tubing 34 which then provides nutrient solution to the plants via spray heads 40 as described earlier. The drain side of the valve has port 92 which allows spent solution to drain into the cavity in drain half 21. Port 93 allows this fluid to drain out of the valve into fluid reservoir 30. A cleanable strainer 44 is provided over the drain inlet 92 to prevent debris from entering the valve cavity. A small nozzle 45 is provided on the outlet tubing located on port 91. When nutrient is pumped into the cultivation chamber 36 via tubing 34 a small jet is forced out of nozzle 45 impinging on strainer 44. This jet cleans the strainer each time the valve is activated thereby cleaning off any debris that may accumulate on the strainer preventing possible cloggage.

When the hydroponic solution is pumped into the flooding control valve 10 through port 90, fluid accumulates inside cavity 50 which starts to pressurize as the only possible discharge is through the small orifice sprayers 40. The rise in pressure forces the flexible membrane 52 against the drain side of the valve cavity as this side is not pressurized. The membrane 52 seals against the cavity shutting off drain flow from port 92 to 93 as shown in FIG. 2B. With the drain now closed, solution accumulates in cultivation vessel 36 until the pump 32 is shut off. When the pump is switched off, the pressure in the valve cavity dissipates and it collapses back to its natural flat profile as shown in FIG. 2C. This is turn permits fluid to flow through port 92 and past the gap between the relaxed membrane and the cavity wall out through port 93 causing fluid to completely drain out of cultivation vessel 36. The overall operation can be readily visualized by reference to FIG. 3A which is a schematic of the system using a submersible pump. This is the simplest configuration. A submersible pump 32 in placed inside the fluid reservoir 30. The discharge from pump 32 is connected to polymeric tube 11 which in turn is connected to feed inlet port 90 located on the underside of the flooding control valve assembly 10. Distribution tube 34 is connected to the feed outlet port 91. In operation pump 32 is switched on and hydroponic solution 31 from reservoir 30 is sprayed into cultivation chamber 36. Fluid is prevented from draining out of cultivation vessel 36 by feed pressure in the flooding control valve 10 as described earlier. Adjustable overflow tube 20 directs excess solution from vessel 36 back into reservoir 30. Once the flooding is complete, pump 32 is switched off and all the fluid inside vessel drains out through the now depressurized flooding control valve 10 back into reservoir 30.

In a preferred embodiment, delivery tubing 34 may be made from semi-rigid commercial PVC drip irrigation tubing and commercial drip spray heads 40 were pierced into it at 1 foot intervals. Cultivation vessel 36 may be made from 5 inch cross section square fence posts with glued end caps. Pump 32 may comprise a low cost submersible fountain pump and the fluid reservoir may comprise a plastic tote box. A household lamp timer 98 was used to control the system. This design approach and choice of construction materials may result in a cost of less than about $200 for an entire hydroponic cultivation system capable of supplying the needs of a small family. Plant growth and yields also exceeded that of commercial hydroponic units.

Multiple plant cultivation vessels can be connected to a single feed pump and reservoir. It is just a simple matter of connecting the flooding control valves in parallel using inexpensive flexible tubing.

Figure 3A:
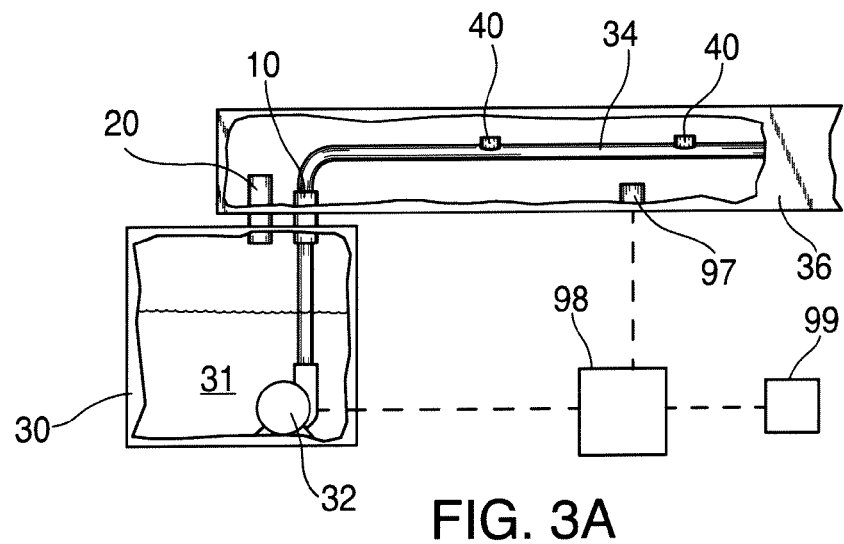
FIG. 3A is a schematic view of the valve and other components of the hydroponic system.

Referring to FIG. 3A, the "ebb and flow" cycles may be controlled by a simple timer 98, or it may be triggered by a sensor 97 that monitors the moisture content of culture media around the plant roots. This sensor would then start the "ebb and flow" cycle on demand when the moisture content drops below a preset limit. This method reduces hydroponic fluid consumption. This moisture sensor can also be used to trigger an alarm 99 to alert the operator in the event a pump or system malfunction is causing the plant roots to dry out. With this early detection alarm it should be possible to correct the situation before the plants are damaged beyond recovery. In a preferred embodiment, a VG400 moisture sensor (manufactured by Vegetronix of Sandy, Utah, USA) may be used to monitor and control moisture content. This sensor provides an analog voltage proportional to moisture content and can easily be coupled to an electronic controller. Either control system allows for unattended operation except for occasional recharging of the fluid reservoir with fresh hydroponic solution.

Unlike devices and systems according to the prior art, the system disclosed in the present invention does not drain through the feed pump, so the feed pump can be placed in any orientation, even above the cultivation vessels. This feature of the present invention allows any pump, including positive displacement pumps to be used. This also provides the ability to pump only from a fresh hydroponic fluid reservoir and collect spent fluid in another independent reservoir, thereby not contaminating the feed solution.

Figure 3B:
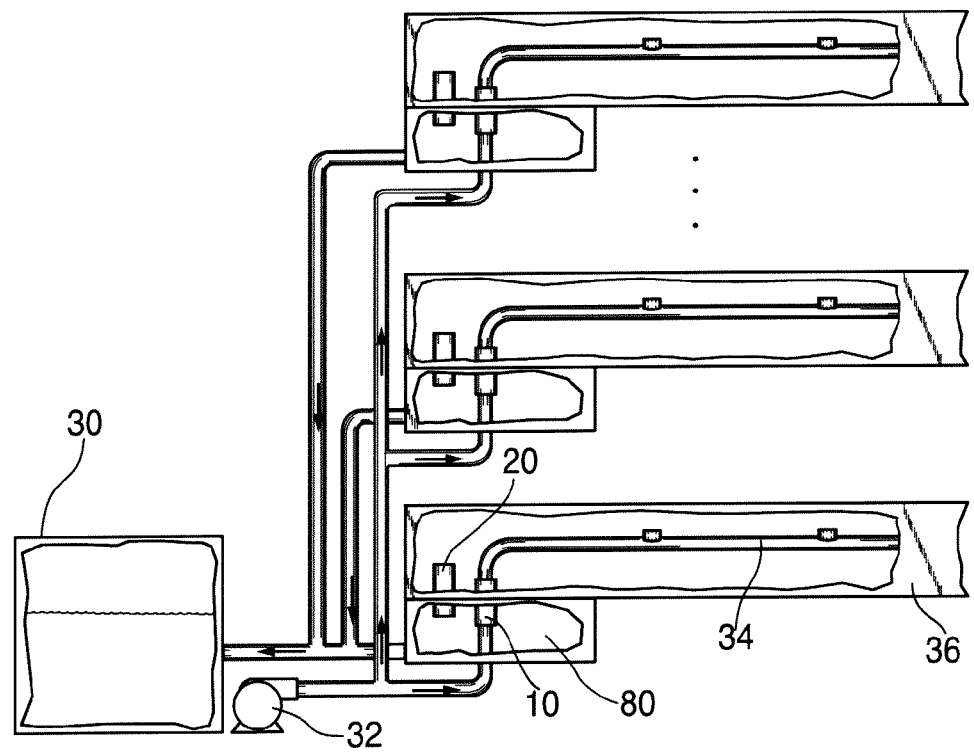
FIG. 3B is an alternate embodiment where an external pump is used to supply a series of cultivation vessels.

FIG. 3B depicts an alternative embodiment where a non-submersible feed pump 32 is located outside the fluid reservoir 30. The advantage is that non-submersible pumps are cheaper, more reliable, and easier to service than submersible ones. The pump discharge may be piped to any number of cultivation vessels 36, each equipped with its own flooding control valve 10. A small sump 80 must be provided on each cultivation vessel to receive the overflow, and drain back spent solution from each cultivation vessel. This fluid can then be directed back to the fluid reservoir by gravity. No power source or mechanical float of any kind is required at any of the cultivation vessels. It is only important that the cultivation vessel and sumps be positioned at a higher elevation than the fluid reservoir, which may be placed in a basement or simply a buried drum.

It should be understood that the foregoing description is only illustrative of embodiments of the present invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A hydroponic irrigation system, comprising:
   a cultivation vessel adapted to contain one or more plants to be cultivated;
   a reservoir adapted to contain a hydroponic solution for irrigating said one or more plants;
   a pump coupled to said reservoir and adapted to pump said hydroponic solution to said cultivation vessel;
   a delivery tube coupled to said pump at a proximal end thereof, disposed within said cultivation vessel, and closed at a distal end thereof;
   means for distributing said hydroponic solution coupled to said delivery tube in proximity to said one or more plants;
   a flooding control valve coupled between said pump and said delivery tube; and an overflow tube coupled between said cultivation vessel and said reservoir;
   wherein said hydroponic solution ebbing from said reservoir does not drain through said pump;
   wherein said flooding control valve comprises:
      a cavity having a first portion adapted to feed said hydroponic solution through said delivery tube to said one or more plants, and a second portion adapted to drain said hydroponic solution from said cultivation vessel to said reservoir; and
      means for controlling distribution of said hydroponic solution within said flooding control valve;
   wherein said distribution controlling means comprises:
      a plurality of ports including a first intake port coupled to receive said hydroponic solution from said pump, a first discharge port coupled to said delivery tube, a second intake port coupled to drain said hydroponic solution from said cultivation vessel, and a second discharge port coupled to said reservoir; and
      a membrane disposed within said cavity between said first and second portions
   a strainer coupled to said second intake port to strain said hydroponic solution from said cultivation vessel; and
   a nozzle in said delivery tube proximate to and directed at said second intake port;
   whereby said nozzle jets a stream of hydroponic solution at said strainer when said pump pumps said hydroponic solution to said cultivation vessel, thereby cleaning said strainer each time said flooding control valve is activated.

2. The irrigation system according to claim 1, wherein said pump is disposed below said cultivation vessel.

3. The irrigation system according to claim 1, wherein said pump is disposed above said cultivation vessel.

4. The irrigation system according to claim 1, wherein said hydroponic solution distributing means comprises one or more spray heads, each of which is disposed in proximity to a respective one of said one or more plants.

5. The irrigation system according to claim 1, wherein said overflow tube is disposed within said cultivation vessel at a predetermined height adapted to drain excess hydroponic solution from said cultivation vessel to said reservoir.

6. The irrigation system according to claim 1, further comprising another independent reservoir.

7. The irrigation system according to claim 6, wherein said overflow tube is disposed within said cultivation vessel at a predetermined height adapted to drain excess hydroponic solution from said cultivation vessel to said other independent reservoir.

8. The irrigation system according to claim 1, wherein said membrane comprises a flexible membrane adapted to be displaced by a relative pressure within said first and second portions.

9. The irrigation system according to claim 8, wherein said flexible membrane is displaced to close said second intake and discharge ports when said pump pumps said hydroponic solution to said cultivation vessel.

10. The irrigation system according to claim 1, further comprising a timer coupled to said pump to control a cycling of said pump.

11. The irrigation system according to claim 1, further comprising a moisture sensor disposed within said cultivation vessel and coupled to said pump to control a cycling of said pump.

12. A hydroponic irrigation system, comprising:
   a plurality of cultivation vessels, each of which is adapted to contain one or more plants to be cultivated;
   a reservoir adapted to contain a hydroponic solution for irrigating said one or more plants within each of said plurality of cultivation vessels;
   a pump coupled to said reservoir and adapted to pump said hydroponic solution to each of said plurality of cultivation vessels;
   a plurality of delivery tubes, each of which is coupled to said pump at a proximal end thereof, disposed within each of said plurality of cultivation vessels, and closed at a distal end thereof;
   a plurality of spray heads for distributing said hydroponic solution coupled respective one of said plurality of delivery tubes in proximity to said one or more plants;
   valve means coupled between said pump and said plurality of delivery tubes for controlling flooding of said plurality of cultivation vessels;
   wherein said valve means comprises a plurality of flooding control valves, each of which is coupled to a respective one of said plurality of delivery tubes and comprises:
      a cavity having a first portion adapted to feed said hydroponic solution through said delivery tube to said one or more plants, and a second portion adapted to drain said hydroponic solution from said cultivation vessel to said reservoir;
      a plurality of ports including a first intake port coupled to receive said hydroponic solution from said pump, a first discharge port coupled to said delivery tube, a second intake port coupled to drain said hydroponic solution from said cultivation vessel, and a second discharge port coupled to said reservoir; and
      a membrane disposed within said cavity between said first and second portions;
      wherein said flexible membrane is displaced to close said second intake and discharge ports when said pump pumps said hydroponic solution to said cultivation vessel; and
   a plurality of overflow tubes, each of which is coupled between a respective one of said plurality of cultivation vessels and said reservoir;
   wherein said hydroponic solution ebbing from said reservoir does not drain through said pump,
   wherein each said flooding control valve further comprises:
      a strainer coupled to said second intake port to strain said hydroponic solution from said cultivation vessel; and
      a nozzle in said delivery tube proximate to and directed at said second intake port;
      whereby said nozzle jets a stream of hydroponic solution at said strainer when said pump pumps said hydroponic solution to said cultivation vessel, thereby cleaning said strainer each time said flooding control valve is activated.

13. The irrigation system according to claim 12, wherein said pump comprises a positive displacement pump coupled to receive said hydroponic solution and disposed outside of said reservoir.

14. The irrigation system according to claim 12, wherein each of said plurality of cultivation vessels is disposed above said pump.

15. The irrigation system according to claim 12, wherein each of said plurality of cultivation vessels is disposed below said pump.

* * * * *